US010612558B2

(12) United States Patent
De Gaillard et al.

(10) Patent No.: US 10,612,558 B2
(45) Date of Patent: Apr. 7, 2020

(54) ROTARY ASSEMBLY OF AN AERONAUTICAL TURBOMACHINE COMPRISING AN ADDED-ON FAN BLADE PLATFORM

(71) Applicant: SAFRAN AIRCRAFT ENGINES, Paris (FR)

(72) Inventors: Thomas Alain De Gaillard, Paris (FR); Alexandre Bernard Marie Boisson, Moissy Cramayel (FR); Matthieu Arnaud Gimat, Merignac (FR); Audrey Laguerre, Alfortville (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 207 days.

(21) Appl. No.: 15/741,839

(22) PCT Filed: Jul. 6, 2016

(86) PCT No.: PCT/FR2016/051711
§ 371 (c)(1),
(2) Date: Jan. 4, 2018

(87) PCT Pub. No.: WO2017/006054
PCT Pub. Date: Jan. 12, 2017

(65) Prior Publication Data
US 2018/0202458 A1 Jul. 19, 2018

(30) Foreign Application Priority Data
Jul. 8, 2015 (FR) ...................................... 15 56459

(51) Int. Cl.
*F04D 29/34* (2006.01)
*F01D 5/06* (2006.01)
(Continued)

(52) U.S. Cl.
CPC ............ *F04D 29/34* (2013.01); *F01D 5/066* (2013.01); *F01D 11/008* (2013.01);
(Continued)

(58) Field of Classification Search
CPC .......... F01D 5/225; F01D 5/02; F01D 11/008; F01D 5/30; F01D 5/282; F01D 5/32;
(Continued)

(56) References Cited

U.S. PATENT DOCUMENTS 3,712,757 A * 1/1973 Goodwin .................. F01D 5/28
416/245 R
5,049,035 A * 9/1991 Marlin ...................... F01D 5/22
416/193 A
(Continued)

FOREIGN PATENT DOCUMENTS

CN 103930652 A 7/2014
EP 2503102 A2 * 9/2012 ............ F01D 11/008
(Continued)

OTHER PUBLICATIONS

International Search Report as issued in International Patent Application No. PCT/FR2016/051711, dated Sep. 30, 2016.

*Primary Examiner* — Woody A Lee, Jr.
*Assistant Examiner* — Brian Christopher Delrue
(74) *Attorney, Agent, or Firm* — Pillsbury Winthrop Shaw Pittman LLP

(57) ABSTRACT

A rotary assembly of an aviation turbine engine, includes a fan disk having at least one tooth and at least one platform mounted on the tooth of the fan disk. The tooth of the fan disk includes a tab extending the tooth axially upstream, and the platform includes a locking ring at its upstream end for receiving the tab of the tooth of the fan disk. The assembly
(Continued)

further includes a spacer positioned inside the locking ring so as to block the platform on the tab of the tooth of the fan disk.

8 Claims, 3 Drawing Sheets

(51) Int. Cl.
| | |
|---|---|
| *F04D 29/32* | (2006.01) |
| *F01D 11/00* | (2006.01) |
| *F04D 29/64* | (2006.01) |
| *F01D 5/30* | (2006.01) |
| *B64D 27/10* | (2006.01) |

(52) U.S. Cl.
CPC ......... *F04D 29/322* (2013.01); *F04D 29/329* (2013.01); *F04D 29/646* (2013.01); *B64D 27/10* (2013.01); *F01D 5/3015* (2013.01); *F05D 2220/36* (2013.01); *F05D 2300/603* (2013.01)

(58) Field of Classification Search
CPC ....... F01D 5/323; B29C 70/682; B29C 70/70; B29C 70/84; B29C 70/865; B29K 2309/08; B29K 2619/00; B29K 2627/12; B29K 2707/04; B29L 2031/082; F05D 2220/36; F05D 2230/23; F05D 2300/431; F05D 2300/432; F05D 2300/603; Y02T 50/672
See application file for complete search history.

(56) References Cited

U.S. PATENT DOCUMENTS

| | | | | | |
|---|---|---|---|---|---|
| 5,161,949 | A * | 11/1992 | Brioude | ................ | F01D 5/22 416/193 A |
| 5,259,728 | A * | 11/1993 | Szpunar | ................ | F01D 5/3007 416/2 |
| 5,281,096 | A * | 1/1994 | Harris | ................ | F01D 11/008 416/193 A |
| 5,957,658 | A * | 9/1999 | Kasprow | ................ | F01D 11/008 415/134 |
| 6,447,250 | B1 * | 9/2002 | Corrigan | ................ | F01D 5/3007 416/193 A |
| 6,457,942 | B1 * | 10/2002 | Forrester | ................ | F01D 5/326 416/220 R |
| 6,481,971 | B1 * | 11/2002 | Forrester | ................ | F01D 5/323 416/221 |
| 6,520,742 | B1 * | 2/2003 | Forrester | ................ | F01D 5/06 416/220 R |
| 6,634,863 | B1 * | 10/2003 | Forrester | ................ | F01D 5/06 416/193 A |
| 6,837,686 | B2 * | 1/2005 | Di Paola | ................ | F01D 5/323 416/220 R |
| 8,162,616 | B2 * | 4/2012 | Belmonte | ................ | F01D 5/22 416/220 R |
| 8,246,310 | B2 * | 8/2012 | Pierrot | ................ | F04D 29/321 416/220 R |
| 8,568,102 | B2 * | 10/2013 | Menheere | ................ | F01D 5/3092 416/219 R |
| 8,834,125 | B2 * | 9/2014 | Alvanos | ................ | C04B 37/00 416/220 R |
| 8,851,853 | B2 * | 10/2014 | Alvanos | ................ | F01D 5/225 416/220 R |
| 8,936,440 | B2 * | 1/2015 | Alvanos | ................ | F01D 5/147 416/193 A |
| 9,267,386 | B2 * | 2/2016 | Turner | ................ | F01D 11/008 |
| 9,303,531 | B2 * | 4/2016 | Hasting | ................ | F01D 9/042 |
| 9,752,449 | B2 * | 9/2017 | Bottome | ................ | F01D 11/008 |
| 10,253,640 | B2 * | 4/2019 | Mortier | ................ | F01D 11/008 |
| 10,344,601 | B2 * | 7/2019 | Turner | ................ | F01D 11/008 |
| 2004/0013528 | A1 * | 1/2004 | Leathart | ................ | F01D 5/323 416/220 R |
| 2006/0272407 | A1 * | 12/2006 | Audic | ................ | G01M 1/34 73/460 |
| 2008/0273980 | A1 * | 11/2008 | Belmonte | ................ | F01D 5/22 416/214 A |
| 2010/0150724 | A1 * | 6/2010 | Forgue | ................ | F01D 5/3007 416/219 R |
| 2010/0209251 | A1 * | 8/2010 | Menheere | ................ | F01D 5/3007 416/193 A |
| 2012/0244003 | A1 * | 9/2012 | Mason | ................ | F01D 11/008 416/219 R |
| 2014/0271143 | A1 * | 9/2014 | Feeney | ................ | F01D 11/008 415/173.1 |
| 2014/0308133 | A1 * | 10/2014 | Gendraud | ................ | F01D 5/3015 416/193 A |
| 2015/0125305 | A1 * | 5/2015 | Duelm | ................ | F04D 29/023 416/193 A |
| 2016/0341071 | A1 * | 11/2016 | Alarcon | ................ | F01D 11/008 |

FOREIGN PATENT DOCUMENTS

| | | | | |
|---|---|---|---|---|
| EP | 3078813 A1 * | 10/2016 | ............ | F01D 11/008 |
| FR | 2 988 426 A1 | 9/2013 | | |
| FR | 2 988 427 A1 | 9/2013 | | |
| WO | WO-2013173089 A1 * | 11/2013 | | |

* cited by examiner

ROTARY ASSEMBLY OF AN AERONAUTICAL TURBOMACHINE COMPRISING AN ADDED-ON FAN BLADE PLATFORM

CROSS REFERENCE TO RELATED APPLICATIONS

This application is the U.S. National Stage of PCT/FR2016/051711 filed Jul. 6, 2016, which in turn claims priority to French Application No. 1556459 filed Jul. 8, 2015. The contents of both applications are incorporated herein by reference in their entirety.

BACKGROUND OF THE INVENTION

The present invention relates to the general field of aviation turbine engines, and more precisely to the field of fan blade platforms attached to an aviation turbine engine.

In a turbine engine, attached fan blade platforms need to perform several functions. From an aerodynamic point of view, these platforms serve firstly to define the air flow passage. In addition, they must also be capable of withstanding large forces without deforming and of remaining secured to the disk that carries them.

In order to satisfy these various requirements, certain configurations have been proposed in which platforms possess a first portion serving to define the air flow passage and to retain the platform while the engine is rotating, and a second portion serving to limit deformation to the first portion under the effect of centrifugal forces and to hold the platform in position when the engine is stopped.

In existing solutions, the platform may be in the form of a box section beam with a two-dimensional passage wall that is held downstream by a drum and upstream by a shroud, with upstream retention by the shroud taking place above the tooth of the fan disk (a flange of the shroud serves to block the platform axially and radially at its upstream end).

Such retention taking place above the tooth of the disk by using a shroud presents the drawback of imposing a large hub ratio, where the hub ratio is the ratio of the radius measured between the axis of rotation and the point of the leading edge of the blade flush with the surface of the platform divided by the radius measured between the axis of rotation and the outermost point of the leading edge.

In order to optimize the performance of the fan, and more generally of the engine, it is desirable to have available a rotary assembly for an aviation turbine engine that includes an attached fan blade platform that is mounted on a fan disk and that presents a hub ratio that is as small as possible.

OBJECT AND SUMMARY OF THE INVENTION

A main object of the present invention is thus to mitigate such drawbacks by proposing a rotary assembly of an aviation turbine engine, the assembly comprising: a fan disk of an aviation turbine engine, the assembly comprising a fan disk having at least one tooth and at least one platform mounted on the tooth of the fan disk, the assembly being characterized in that the tooth of the fan disk includes a tab extending said tooth axially upstream, and in that the platform includes a locking ring at its upstream end for receiving the tab of the tooth of the fan disk.

This assembly, is applicable to any type of attached fan blade platform for an aviation turbine engine, and it serves to reduce the hub ratio by holding the platform radially by means of the upstream locking ring.

In addition, an assembly of the invention is advantageous in that it does not require additional attachments in order to hold the platform radially at its upstream end, since the platform is held by the locking ring that forms an integral portion of the platform. Furthermore, a tooth of the fan disk generally already presents a tab that extends it upstream, thereby reducing the operations needed for designing an assembly of the invention and avoiding any need to redefine the shapes of surrounding parts.

The assembly is also advantageous in that, by acting on the size of the locking ring compared with the section of the tab, it makes it possible to leave the platform with a degree of freedom to move tangentially. This degree of freedom makes it possible to avoid damage as caused in particular by objects being ingested into the fan.

Advantageously, the platform may be made of organic matrix composite material made from fiber reinforcement densified with a matrix.

Preferably, the assembly further comprises a downstream shroud fastened to the fan disk and blocking the platform downstream.

Also preferably, the assembly further includes an upstream shroud fastened on the fan disk and blocking the platform axially upstream.

In an embodiment, the tab of the tooth of the disk and the locking ring have sections that are substantially identical.

The assembly further includes a spacer positioned inside the locking ring so as to block the platform on the tab of the tooth of the fan disk.

The tooth of the disk may present a plane portion extending over a first length, the tab of the tooth of the disk extending over a second length lying in the range 4% to 15% of said first length.

In embodiments, the platform has a box section beam with a passage wall, a bottom wall, and two side walls extending between the bottom wall and the passage wall. With this arrangement, and when the platform is made of composite material comprising fiber reinforcement densified by a matrix, the upstream portion of the box section beam works in traction in the fiber direction because of the locking ring, thereby ensuring good mechanical strength for the assembly.

The invention also provides a fan for an aviation turbine engine, the fan comprising a rotary assembly as described above, wherein the fan disk presents at least two teeth defining between them a slot, and at least one blade provided with a root mounted in the slot of the fan disk.

The invention also provides a method of assembling a rotary assembly as described above, the method comprising:

moving the platform radially up to the tooth of the fan disk while positioning the locking ring to face the tab of the tooth of the fan disk; and moving the platform in translation axially from upstream to downstream along the tooth of the fan disk.

BRIEF DESCRIPTION OF THE DRAWINGS

Other characteristics and advantages of the present invention appear from the following description made with reference to the accompanying drawings which show embodiments having no limiting character. In the figures.

DETAILED DESCRIPTION OF THE INVENTION

In the present disclosure, the terms "longitudinal", "transverse", "lower", "upper" and their derivatives are defined relative to the main direction of the platform under consideration; the terms "transverse", "radial", "tangential", "inner", "outer" and their derivatives are defined relative to the main axis of the turbine engine; and finally the terms "upstream" and "downstream" are defined relative to the flow direction of the fluid passing through the engine. Also, unless specified to the contrary, the same reference signs in the various figures designate the same characteristics.

Figure 1:
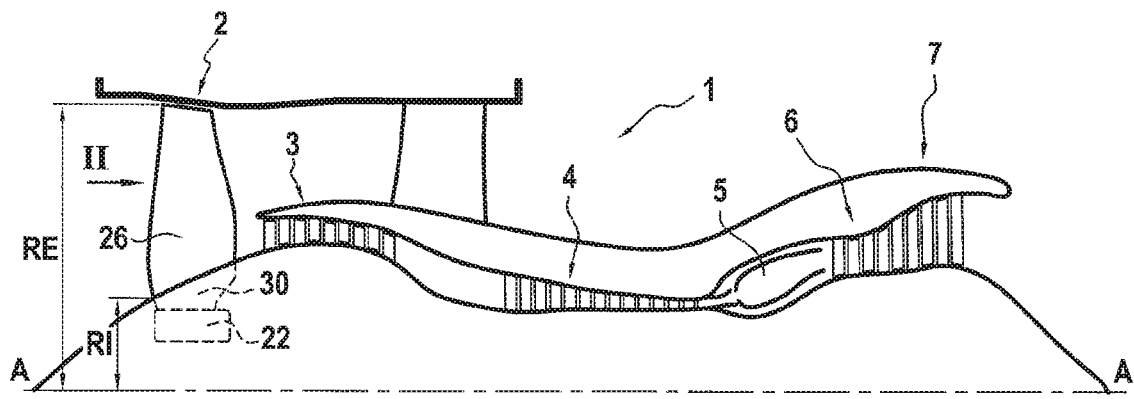
FIG. 1 is a diagrammatic section view of a turbine engine of the invention.

FIG. 1 is a diagrammatic longitudinal section view of a bypass turbojet 1 centered on the axis A-A. Going from upstream to downstream, it comprises: a fan 2; a low pressure compressor 3; a high pressure compressor 4; a combustion chamber 5; a high pressure turbine 6; and a low pressure turbine 7.

Figure 2:
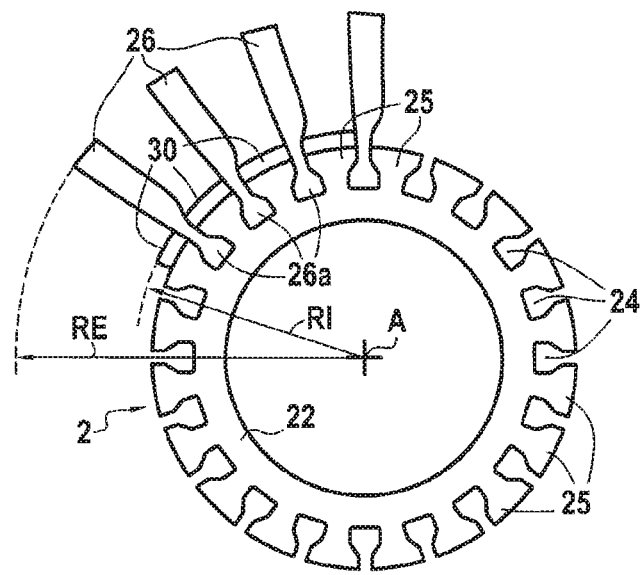
FIG. 2 is a diagrammatic view of the FIG. 1 fan as seen looking along direction II.

FIG. 2 shows the FIG. 1 fan 2 diagrammatically seen looking along direction II. The fan 2, constituting the subject matter of the present invention, comprises a fan disk 22 having a plurality of slots 24 formed in its outer periphery. These slots 24 are rectilinear and they extend axially from upstream to downstream all along the disk 22. They are also regularly distributed all around the axis A-A of the disk 22. In this way, each slot 24, together with its neighbor, defines a tooth 25 that likewise extends axially from upstream to downstream all along the disk 22. In equivalent manner, a slot 24 is defined between two neighboring teeth 25.

The fan 2 also comprises a plurality of blades 26 of curvilinear profile (only four blades 26 are shown in FIG. 2). Each blade 26 possesses a root 26a that is mounted in a respective slot 24 of the fan disk 22. For this purpose, the root 26a of the blade 26 may be Christmas-tree shaped or dovetail-shaped so as to match the shape of the slots 24.

Finally, the fan 2 has a plurality of attached platforms 30, each platform 30 being attached in the gap between two adjacent fan blades 26, in the vicinity of their roots 26a, so as to define the inside of an annular air inlet passage into the fan 2, the passage being defined on the outside by a fan casing.

FIGS. 1 and 2 also show an inner radius RI and an outer radius RE. The inner radius RI corresponds to the radius between the axis of rotation A-A and the point of the leading edge of a blade 26 that is flush with the surface of a platform 30. The outer radius RE corresponds to the radius between the axis of rotation A-A and the outermost point of the leading edge of a blade 26. These radii RI and RE are used for calculating the hub ratio RI/RE that the rotary assembly of the invention sets out to reduce (in particular by reducing the inner radius RI). In other words, reducing the hub ratio, in particular by acting on the inner ratio RI, amounts to bringing the air inlet flow passage closer to the fan disk.

Figure 3:
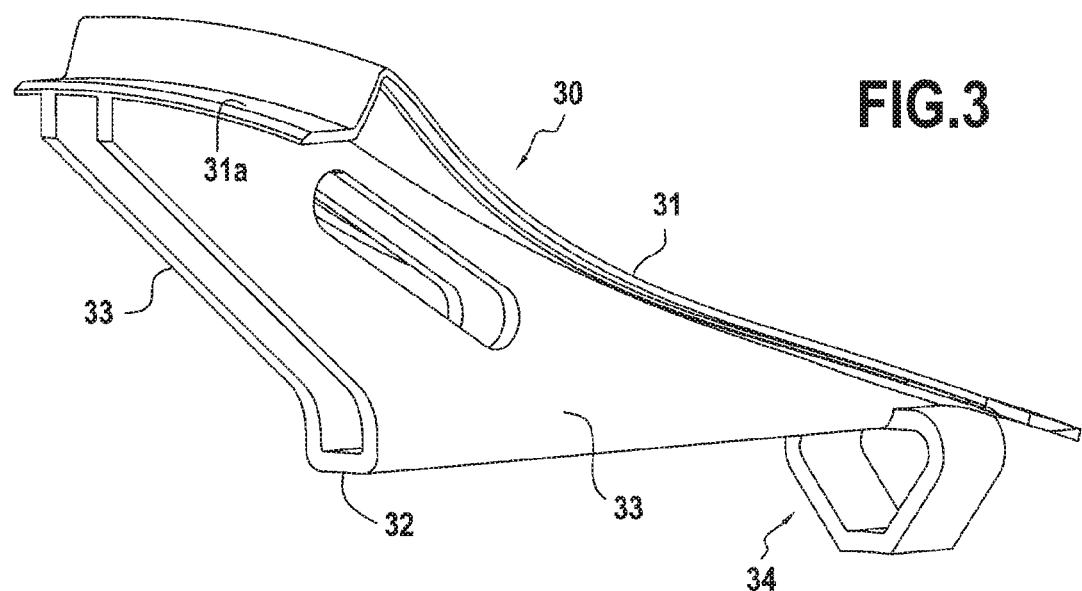
FIG. 3 is a diagrammatic perspective view of a platform that is to be used in a rotary assembly of the invention.

A platform 30 that is to be used in a rotary assembly in an embodiment of the invention is shown in perspective in FIG. 3. In this example, the platform 30 is in the form of a box section beam with a passage wall 31 forming the top or outer face of the platform 30 and having a sloping profile, a bottom wall 32 that enables the platform to rest on a tooth 25 of the disk 22 when the engine is stopped, and two side walls 33 extending radially between the bottom wall 32 and the passage wall 31.

In known manner, such a platform 30 may be made out of organic matrix composite material comprising fiber reinforcement densified by a matrix.

In accordance with the invention, the platform 30 has a locking ring at its upstream end for receiving the tab 25a (FIGS. 4, 5, and 6) of a tooth 25 of the disk 22. In this embodiment, the ring 34 presents a trapezoid-shaped section.

Figure 4:
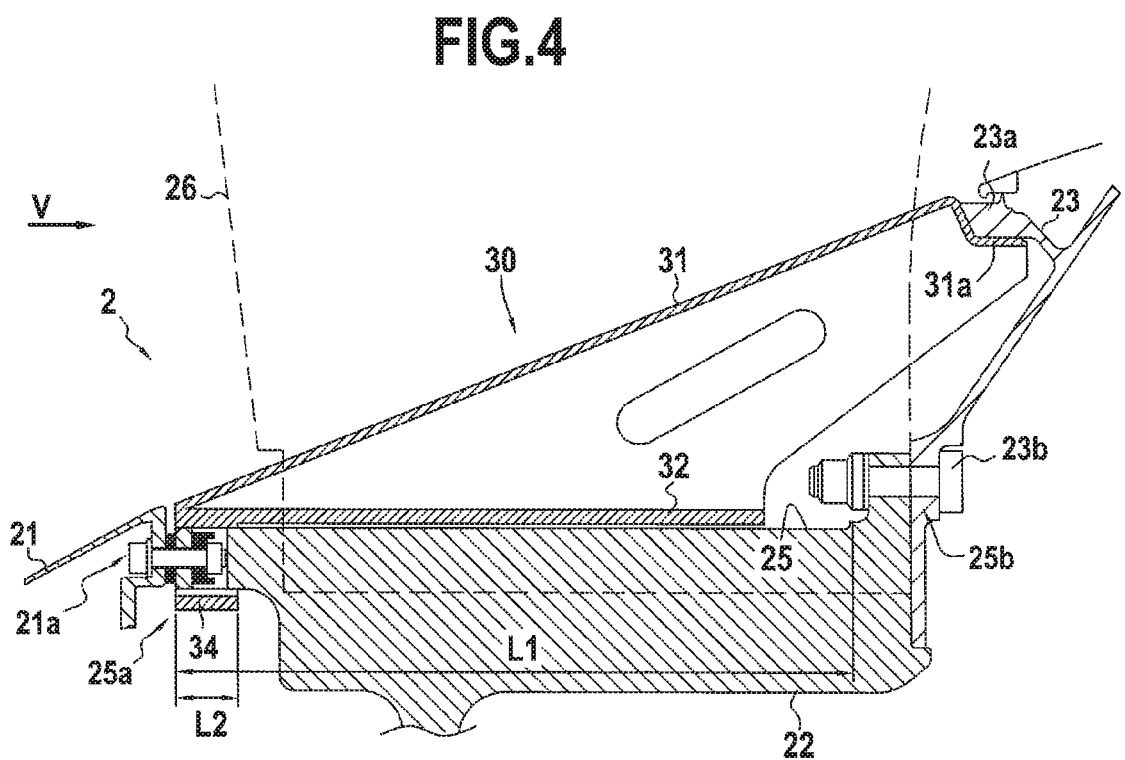
FIGS. 4 and 5 are respectively a diagrammatic section view and an upstream view of a rotary assembly in an embodiment of the invention.

With reference to FIG. 4, there follows a description of a rotary assembly making use of the platform 30 as described above with reference to FIG. 3. FIG. 4 shows in greater detail a fan 2 in an embodiment of the invention (seen in section through a tooth of the fan disk, on section plane IV shown in FIG. 5).

In FIG. 4, there can be seen in particular a fan 2 comprising: an upstream shroud 21; the fan disk 22; and a downstream drum 23 (also referred to as a "booster" drum or a "booster" shroud) having a retaining flange 23a for co-operating with an assembly step 31a at the downstream end of the platform 30. The downstream drum 23 is fastened to the fan disk 22 via a hole 25b formed through a downstream step in the tooth 25, by means of fasteners 23b. The shroud 21 is fastened by means of fasteners 21a to the fan disk 22 via the tab 25a that extends the tooth 25 of the disk 22 axially upstream.

It should be observed that the tooth 25 of the disk 22 presents a plane portion (between the downstream step including the hole 25b and the upstream end of the tab 25a) that extends over a first length L1, and that the tab 25a of the tooth of the disk extends over a second length L2 that may constitute in the range 4% to 15% of the first length L1. The locking ring 34 extends axially over a length that is preferably shorter than the length L2 of the tab 25a.

The fan disk 22 is coupled to the drive shaft of the low pressure turbine 7 of the engine so that in operation the upstream shroud 21, the fan disk 22, the blades 26, and the downstream drum 23 are driven together in rotation by the low pressure turbine 7. The platforms 30 mounted between the upstream shroud 21 and the downstream drum 23 and blocked axially in position by those two elements are thus likewise driven together in rotation.

The platform 30 is held radially at its upstream end by the locking ring 34 that is "threaded" over the tab 25a. In other words, the tab 25a of the tooth 25 is inserted into the locking ring 34 of the platform 30.

In advantageous manner, the tab 25a presents a section of trapezoid shape for co-operating with the ring 34 that likewise presents an inside section of trapezoid shape that is substantially identical to the section of the ring. As a result, the platform 30, once threaded onto the tab 25a, is blocked both in the radial and the tangential directions. Naturally, any other type of section could be envisaged for the tab 25a or the ring 34, e.g. a section that is circular, rectangular, etc.

Figure 5:
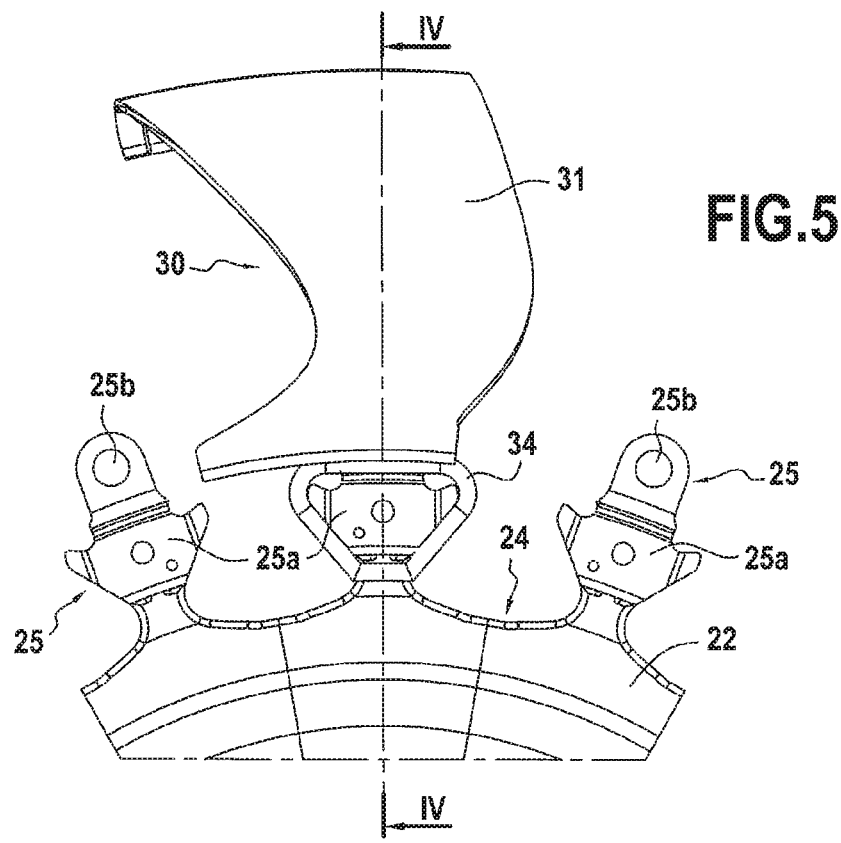

FIG. 5 is a view from upstream (along direction V in FIG. 4) of a rotary assembly of the invention including a fan disk 22 having a platform 30 as shown in FIG. 4 mounted thereon.

Figure 6:
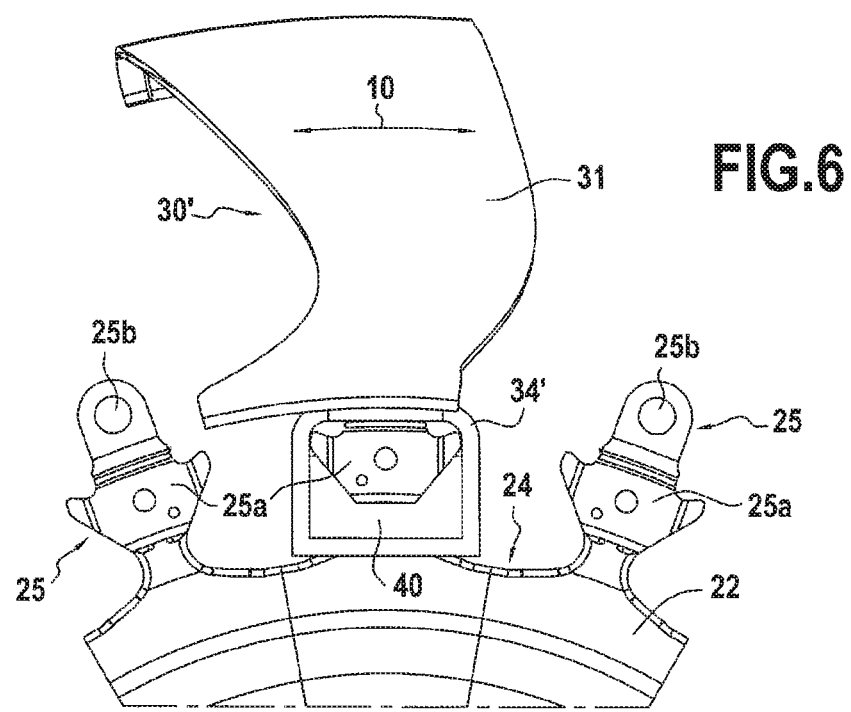
FIG. 6 is an upstream view of a rotary assembly in another embodiment of the invention.

FIG. 6 shows another embodiment of a rotary assembly of the invention likewise including a disk 22 on which a platform 30' is mounted.

Unlike the rotary assembly shown in FIGS. 4 and 5, the locking ring 34' of the platform 30' of the rotary assembly in FIG. 6 presents a rectangular section that is larger than the trapezoid-shaped section of the tab 25a of the tooth 25 of the disk 22. A spacer 40 is then positioned between the ring 34' and the tab 25a (when the tab 25a is inserted in the ring), in order to occupy the space between those two elements and block the platform radially and tangentially at its upstream end. The spacer 40 presents a section that corresponds substantially to the shape of the space left between the ring 34' and the tab 25a, which in this example is U-shaped.

The use of this spacer 40 is advantageous, since it enables the platform 30' to be mounted with a certain amount of tangential clearance, and subsequently to lock it with the spacer. Specifically, when assembling the fan, the complex and bulky profiles of the blades and of the platforms leave very little room for maneuver when assembling the platforms on the disk. Thus, assembling the fan is made easier when it is possible to make the platforms pivot tangentially (in the direction of arrows 10 in FIG. 6).

Finally, in order to assemble the fan of the invention, it is possible to begin by assembling the downstream drum 23 on the disk 22, and then putting into place a portion of the fastener element 21a (e.g. a nut) that is to fasten the upstream shroud 21 onto the disk 22. Thereafter, the platform 30, 30' is moved up to the disk of the tooth in a radial direction so that the locking ring 34, 34' faces the tab 25a and is in alignment therewith. The platform 30, 30' is then moved in translation axially from upstream to downstream so as to move along the tooth of the disk until it becomes blocked downstream by the downstream drum 23. Finally, the upstream shroud 21 is mounted on the disk 22 and is fastened by the fastener elements 21a.

It should be observed that when a spacer 40 is used, it is possible to pivot the platform 30' tangentially while it is being threaded onto the tab 25a of the tooth of the disk, and then to block it with the spacer 40 prior to mounting the upstream shroud 21.

It should also be observed that the invention does not apply only to box-section platforms as in the above-described examples, but may be applied to any type of platform that is attached to fan blades.

The invention claimed is:

1. A rotary assembly of an aviation turbine engine, the assembly comprising: a fan disk having at least one tooth and at least one platform mounted on the tooth of the fan disk, wherein the tooth of the fan disk includes a tab extending axially upstream, and wherein the platform includes a locking ring at its upstream end in which the tab of the tooth of the fan disk is inserted, and wherein the rotary assembly further includes a spacer positioned inside the locking ring so as to block the platform on the tab of the tooth of the fan disk.

2. An assembly according to claim 1, further comprising a downstream shroud fastened to the fan disk and blocking the platform downstream.

3. An assembly according to claim 1, further comprising an upstream shroud fastened on the fan disk and blocking the platform axially upstream.

4. An assembly according to claim 1, wherein the tab of the tooth of the fan disk and the locking ring have sections that are substantially identical.

5. An assembly according to claim 1, wherein the tooth of the fan disk presents a plane portion extending over a first length, the tab of the tooth of the fan disk extending over a second length lying in the range 4% to 15% of said first length.

6. An assembly according to claim 1, wherein the platform has a box section beam with a passage wall, a bottom wall, and two side walls extending between the bottom wall and the passage wall.

7. A fan for an aviation turbine engine comprising an assembly according to claim 1, wherein the fan disk presents at least two teeth defining between them a slot, and at least one blade provided with a root mounted in the slot of the fan disk.

8. A method of assembling an assembly according to claim 1, the method comprising:
moving the platform radially up to the tooth of the fan disk while positioning the locking ring to face the tab of the tooth of the fan disk; and
moving the platform in translation axially from upstream to downstream along the tooth of the fan disk.

* * * * *